United States Patent
Peron

(10) Patent No.: US 12,368,298 B2
(45) Date of Patent: Jul. 22, 2025

(54) ELECTRIC POWER SUPPLY DEVICE OF AT LEAST ONE ELECTRICAL ENERGY CONSUMING MEMBER OR OF AT LEAST ONE ELECTRICAL ENERGY RENDERING MEMBER

(71) Applicant: FORSEE POWER, Ivry-sur-Seine (FR)

(72) Inventor: Benoît Peron, Tours (FR)

(73) Assignee: FORSEE POWER, Ivry-sur-Seine (FR)

( * ) Notice: Subject to any disclaimer, the term of this patent is extended or adjusted under 35 U.S.C. 154(b) by 864 days.

(21) Appl. No.: 17/429,494

(22) PCT Filed: Jan. 30, 2020

(86) PCT No.: PCT/FR2020/050147
§ 371 (c)(1),
(2) Date: Aug. 9, 2021

(87) PCT Pub. No.: WO2020/161414
PCT Pub. Date: Aug. 13, 2020

(65) Prior Publication Data
US 2022/0131370 A1 Apr. 28, 2022

(30) Foreign Application Priority Data
Feb. 8, 2019 (FR) ...................... 19/01283

(51) Int. Cl.
*H02J 1/10* (2006.01)
*B60L 50/60* (2019.01)
*B60L 58/18* (2019.01)

(52) U.S. Cl.
CPC ............. *H02J 1/102* (2013.01); *B60L 50/60* (2019.02); *B60L 58/18* (2019.02)

(58) Field of Classification Search
CPC ............ B60L 50/60; B60L 58/18; H02J 1/102
See application file for complete search history.

(56) References Cited

U.S. PATENT DOCUMENTS
2013/0317674 A1   11/2013   Arai et al.

FOREIGN PATENT DOCUMENTS
EP     1493643 A1      1/2005
EP     2127935 A2 *  12/2009   ............... B60L 50/51
(Continued)

OTHER PUBLICATIONS

Becerra Gerardo et al.: "A unified hybrid control for DC/DC power converters using port-Hamiltonian formulation"; IECON 2017—43rd Annual Conference of the IEEE Industrial Electronics Society, Oct. 29, 2017 IEEE; pp. 4851-4856.
(Continued)

*Primary Examiner* — Robert J McCarry, Jr.

(57) ABSTRACT

Device for supplying electric power to at least one electrical energy-consuming unit or to at least one electrical energy-supplying unit or to at least one electrical energy-consuming and -supplying unit of an electrical installation, the device including a plurality of electrical energy generators, each generator of the plurality being connected electrically in parallel with the other generators, each generator including a computing unit, a power converter and an electrical energy storage and supply element, the power converter of a generator being bidirectional and configured so as to supervise a value of a setting variable on the basis of an electric charging or discharging power of the storage element of said generator, the electric charging or discharging power being calculated in real time by the computing unit on the basis:
—of a function of the values of the setting variables of the electric charging or discharging power of each of the storage and supply elements of the other generators; and —of a determined setpoint power; and —of a number of generators
(Continued)

that are in a determined operating state, the sum of the electric charging or discharging powers of each storage element of each generator of the plurality being equal to the determined setpoint electric power.

9 Claims, 3 Drawing Sheets

(56) References Cited

FOREIGN PATENT DOCUMENTS

| | | |
|---|---|---|
| JP | 2008029149 A | 2/2008 |
| JP | 2008042989 A | 2/2008 |

OTHER PUBLICATIONS

English Translation to International Search Report for Application No. PCT/FR2020/050147.
International Search Report for Application No. PCT/FR2020/050147.
Written Opinion for Application No. PCT/FR2020/050147.

* cited by examiner

ELECTRIC POWER SUPPLY DEVICE OF AT LEAST ONE ELECTRICAL ENERGY CONSUMING MEMBER OR OF AT LEAST ONE ELECTRICAL ENERGY RENDERING MEMBER

CROSS REFERENCE TO RELATED APPLICATIONS

This application is a National Stage of PCT Application No. PCT/FR2020/050147 filed on Jan. 30, 2020, which claims priority to French Patent Application No. 19/01283 filed on Feb. 8, 2019, the contents each of which are incorporated herein by reference thereto.

TECHNICAL FIELD

The present invention concerns the field of electric vehicles.

BACKGROUND

It is known to power an electric motor, in particular an electric motor whose power supply voltage has a fixed or regulated value, driving a traction member of a vehicle, from an electrical energy storage element. However, when a plurality of electrical energy storage elements are distributed at different locations of a vehicle and interconnected so as to supply with electrical energy at least one electric motor driving a traction member of said vehicle, an uneven physical distribution of the storage elements relative to the motor(s) could generate voltage drops in the interconnection cables. The energies delivered by the storage elements could become erratic, and cause huge current draws between the storage elements.

Hence, the invention aims at providing a solution to all or part of these problems.

BRIEF SUMMARY

To this end, the present invention concerns an electric power device of at least one electrical energy consuming member or of at least one electrical energy rendering member or of at least one electrical energy consuming and rendering member of an electrical installation, the device comprising a plurality of electrical energy generators, each generator of the plurality being electrically connected in parallel with the other generators, each generator comprising a computing unit, a power converter and an electrical energy storage and rendering element, the power converter of a generator being bidirectional and configured to monitor a value of a setting quantity based on a charging or discharging electric power of the storage element of said generator, the charging or discharging electric power being computed in real-time by the computing unit according to:
  a function of the values of the setting quantities of the charging or discharging electric power of each of the storage and rendering elements of the other generators, and
  a determined setpoint power P, and
  a number of generators that are in a determined operating state,
  the sum of the charging or discharging electric powers of each storage element of each generator of the plurality being equal to the determined setpoint electric power P.

According to these arrangements, the regulation of the value of the setting quantity of each generator of the plurality of generators of the device is distributed over each generator which is configured to ensure this regulation in a standalone manner according to the information received thereby from each of the other generators.

According to one embodiment, the invention comprises one or more of the following features, considered alone or in combination.

According to one embodiment, the at least one consuming member is configured to exclusively consume an electrical energy supplied by the device, the at least one rendering member is configured to exclusively render an electrical energy to the device, the consuming and rendering member is configured to alternately consume an electrical energy delivered by the device, or to render an electrical energy to the device.

According to one implementation, the determined power setpoint is determined by a difference between a setpoint voltage of the electrical installation and a measured voltage at the terminals of each generator.

According to these arrangements, the values of the setting quantities converge towards the same values, irrespective of the initial conditions or the impedances of the installation between each generator, while keeping a voltage of the electrical installation regulated around the setpoint voltage of the electrical installation.

According to one embodiment, the function of the function of the values of the setting quantities and of the setpoint power is a Lyapunov function.

According to these arrangements, for a given setpoint power, the charging or discharging electric power is distributed in an uneven manner over the different electrical storage and rendering elements, so that the setting quantity of the electric power is kept balanced over all generators, irrespective of the initial conditions.

According to one embodiment, the electrical installation is a motor-propelled vehicle, for example a tramway, or a train, or a bus, or a truck, or a boat, or an aircraft.

According to one embodiment, the electrical energy consuming member is a reversible electric motor, configured to alternately operate in an electrical energy consumption mode, and in an electrical energy rendering mode.

According to one embodiment, the charging or discharging electric power is computed by the computing unit according to a determined time periodicity depending, at least partially, on the operating frequency or the cutoff frequency of the power converter of the generator, according to a response time of the system.

According to one embodiment, the setting quantity of an electric power is an electric voltage or an electric current intensity or a cumulative count of an electric charge flowing in the storage element.

According to these arrangements, the voltage or the intensity at the terminals of the storage elements of the generators is balanced, irrespective of the initial conditions, regardless of the energetic value of the storage elements, regardless of the number of generators connected in parallel.

According to these arrangements, the setpoint power is instantaneously fractioned and adjusted so as to balance the voltages, or the currents at the terminals of the storage elements.

According to these arrangements, the sum of the computed powers by the generators will always be equal to the setpoint power.

According to one aspect, the invention also concerns a method for the supply of an electrical energy to or for the recovery of an electrical energy rendered by, at least one electrical energy consuming member or of at least one electrical energy rendering member or of at least one electrical energy consuming and rendering member, of an electrical installation, the electrical energy being delivered by or rendered to a plurality of electrical energy generators, each generator of the plurality being electrically connected in parallel with the other generators, each generator comprising a computing unit, a bidirectional power converter and an electrical energy storage and rendering element, the method comprising the following steps are implemented and then repeated according to a repetition time frequency, by each generator of the plurality of generators:

reading by the computing unit of said generator of a value of a setting quantity of the power converter of said generator, and of the value of the setting quantity of the power converter of the other generators;

reading by the computing unit of the value of an operating state of said generator, and of the value of an operating state of each of the other generators of the plurality;

transmission by the computing unit to the other generators of the value of the setting quantity of the power converter of said generator and of the operating state of said generator;

computation by the computing unit of a number of generators that are in a determined operating state, from the value of the operating state of said generator, and from the value of the operating state of each of the other generators of the plurality;

computation by the computing unit of a charging or discharging electric power of the storage element of said generator, according to:

a function of the value of the setting quantity of the charging or discharging electric power of each of the storage and rendering elements of said generators and of the other generators, and a determined setpoint power and the number of generators that are in a determined operating state, the sum of the charging or discharging electric powers of each storage element of each generator of the plurality being equal to the determined setpoint electric power;

monitoring of the value of the setting quantity of the storage and rendering element of said generator based on the charging or discharging electric power computed by the computing unit of said generator.

According to one implementation, the invention comprises one or more of the following features, considered alone or in combination.

According to one implementation, the at least one consuming member is configured to exclusively consume an electrical energy supplied by the device, the at least one rendering member is configured to exclusively render an electrical energy to the device, the consuming and rendering member is configured to alternately consume an electrical energy delivered by the device, or to render an electrical energy to the device.

According to one implementation, the function of the value of the setting quantity of the charging or discharging electric power, is a Lyapunov function.

According to one implementation, the repetition time frequency is determined at least partially according to the operating frequency or the cutoff frequency of the power converter of the generator.

BRIEF DESCRIPTION OF THE DRAWINGS

For a better understanding thereof, an embodiment and/or implementation of the invention is described with reference to the appended drawings representing, as a non-limiting example, an embodiment or implementation respectively of a device and/or of a method according to the invention. The same reference numerals in the drawings refer to similar elements or elements whose functions are similar.

DETAILED DESCRIPTION

Figure 1:
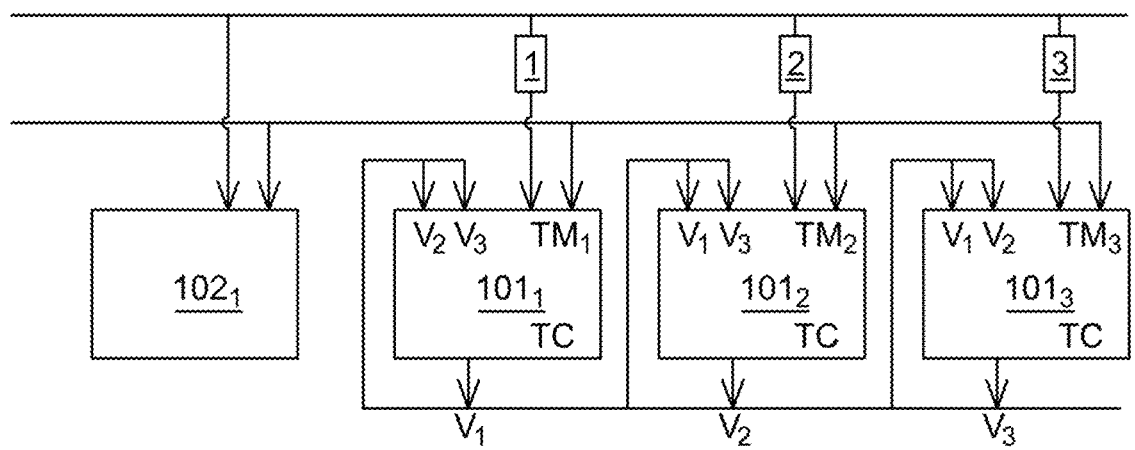
FIG. 1 is a schematic representation of a device according to the invention.

According to an embodiment illustrated in FIG. 1, the electric power device according to the invention comprises a plurality of electrical energy generators ($101_1$, $101_2$, $101_3$), each generator of the plurality being electrically connected in parallel with the other generators, so as to supply the electrical energy required by at least one electrical energy consuming or electrical energy rendering or electrical energy consuming and rendering member ($102_1$) of an electrical installation; the at least one consuming member is configured to exclusively consume an electrical energy supplied by the device; the at least one rendering member is configured to exclusively render an electrical energy to the device; the at least one consuming and rendering member is configured to alternately consume an electrical energy delivered by the device, or to render an electrical energy to the device; according to one embodiment, the electrical installation is a motor-propelled vehicle, for example a tramway, or a train, or a bus, or a boat or an aircraft; and the electrical consuming member consist for example of a reversible electric motor, configured to alternately operate in an electrical energy consumption mode, and in an electrical energy rendering mode and configured to actuate a propulsion or traction means of said vehicle. As example, the vehicle is a tramway including one or several train(s) or wagon(s), each train or wagon being equipped with one or several drive wheel(s) driven by one or several electric motor(s); moreover each of one or several train(s) or wagon(s) of the tramway may be equipped with one or several electric generator(s) ($101_1$, $101_2$, $101_3$) according to the invention. The trains that are equipped with electrically motor-propelled wheels may be different from the trains that are equipped with one or several electric generator(s), the electric generators mounted on different trains being electrically connected with each other and to the different electric motors, for example along at least one cable deployed on all trains, so as to ensure, in parallel, the supply of the electric power required by these electric motors. The electric motors may have different powers.

According to one embodiment, the electric generators may be, totally or partially, grouped together within one or several bank(s) comprising several generators coupled in parallel, the banks then being, in turn, connected to one another so as to ensure the supply, in parallel, of the electric power required by these electric motors.

According to the tramway- or train-type embodiment that has just been described, the generators, and/or the banks grouping together several generators, are physically distributed at different locations of the train, so that some of them could be close to the electric motor(s) $102_1$ driving the drive wheels of the train, whereas other ones could be further away. Some of them may be connected proximate to an additional electric load such as the air-conditioning systems. This uneven physical distribution of the functions results in voltage drops in the interconnection cable(s).

Without a compensation or regulation system, the energies delivered by each generator and/or bank would be erratic, resulting in considerable current draws between the generators and/or the banks.

Figure 2:
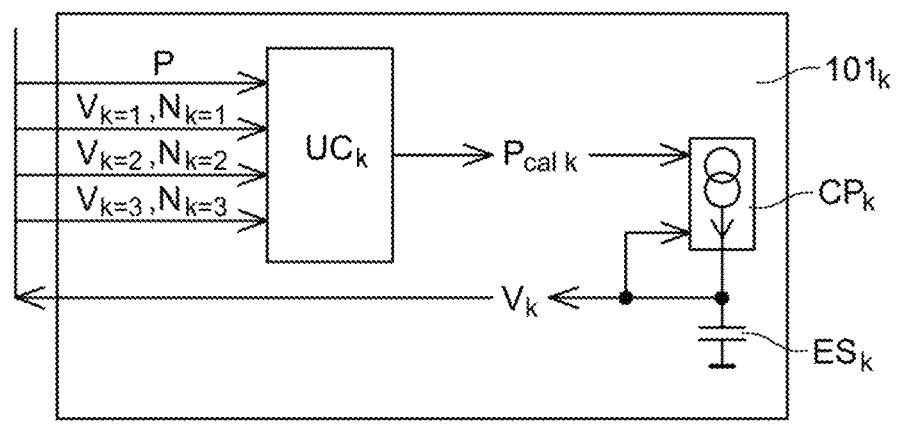
FIG. 2 is a schematic representation of a generator according to the invention.
Figure 3:
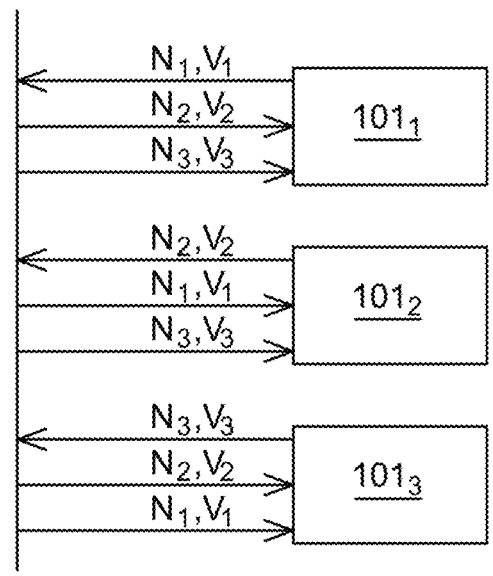
FIG. 3 is a schematic representation of the data exchanges between several generators of a device according to the invention.

As illustrated in FIG. 2, according to one embodiment, each generator of the device comprises a bidirectional power converter $CP_k$ and an electrical energy storage element $ES_k$. For example, the power converter is a 133 kW converter. The power converter allows adapting a voltage- and/or current-type physical quantity present on the interconnection network of the generator into a voltage- and/or current-type quantity $V_k$ corresponding to the need of the electrical energy storage elements.

For all energy storage elements of the generators distributed on the power supply network of the electric motors to be operated in the same manner, a method for computing a charging and/or discharging power adjusted for each storage element of each generator is implemented so that a discharge of the most charged storage element is favored, and/or a charging of the least charged storage element is favored. According to these arrangements, the charge of the different storage elements is consistently brought to a balance, and the flow of undesired currents between the storage elements is avoided.

The charging or discharging power, adjusted for each storage element of each generator, is computed according to a setpoint power P related to the demand of the drive electric motors of the drive wheels.

The regulation method is implemented by each generator in a distributed manner. To this end, as illustrated in FIG. 2, each generator $101_1$, $101_2$, $101_3$ comprises a computing unit $UC_k$, the computing unit of one generator being configured, on the one hand, to transmit to all computing units of the other generators, according to a determined periodicity, a value of the characteristic quantity $V_k$ of a setting of the storage element of the generator and, on the other hand, to receive the values of the characteristic quantity $V_k$ of a setting of the storage element of the other generators interconnected on the power supply network of the motors.

The regulation method also takes into account the possible loss of one or several generator(s) due to a possible failure. For this purpose, each generator $101_k$ keeps an indicator $N_k$ on its operating state, which is disseminated by the computing units of each generator to all computing units of the other generators. These arrangements allow ensuring the operation of the device even in the event of failure of one generator $101_k$.

According to an aspect of the invention, the invention concerns a method.

Figure 4:
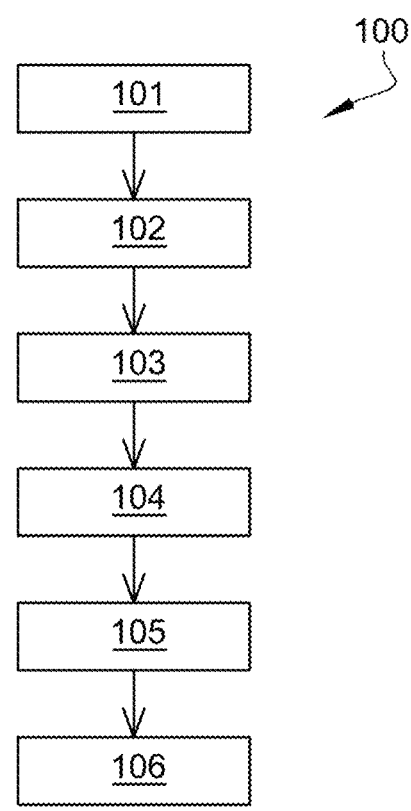
FIG. 4 is a schematic representation of the steps of a method according to the invention.

According to an implementation of the method, the following steps, illustrated in FIG. 4, are implemented in real-time, and then repeated by each generator according to a repetition time frequency, with:
  a step of reading 101 by the computing unit $UC_k$ of said generator a value of a setting quantity $V_k$ of the power converter of said generator, and the value of the setting quantity $V_k$ of the power converter of the other generators;
  a step of reading 102 by the computing unit $UC_k$ the value of an operating state $N_k$ of said generator, and the value of an operating state $N_k$ of each of the other generators $101_1$, $101_2$, $101_3$ of the plurality;
  a step of transmitting 103 by the computing unit $UC_k$ to the other generators the value of the setting quantity $V_k$ of the power converter of said generator and of the operating state $N_k$ of said generator;
  a step of computing 104 by the computing unit $UC_k$ a number of generators $101_1$, $101_2$, $101_3$ that are in a determined operating state, from the value of the operating state $N_k$ of said generator, and from the value of the operating state $N_k$ of each of the other generators $101_1$, $101_2$, $101_3$ of the plurality;
  a step of computing 105 by the computing unit $UC_k$ a charging or discharging electric power $Pcal_k$ of the storage element $ES_k$ of said generator, according to:
  a function of the value of the setting quantity $V_k$ of the charging or discharging electric power $Pcal_k$ of each of the storage and rendering elements of said generators and of the other generators $101_1$, $101_2$, $101_3$, and
  a determined setpoint power P and the number of generators $101_1$, $101_2$, $101_3$ that are in a determined operating state,
  the sum of the charging or discharging electric powers $Pcal_k$ of each storage element of each generator of the plurality being equal to the determined setpoint electric power P;
    monitoring 106 of the value of the setting quantity $V_k$ of the storage and rendering element of said generator $101_1$, $101_2$, $101_3$ based on the charging or discharging electric power $Pcal_k$ computed by the computing unit of said generator $101_1$, $101_2$, $101_3$.

According to one embodiment, the setting quantity $V_k$ corresponds to a cumulative count of an electric charge flowing in each storage element $ES_k$.

According to one implementation, the setpoint power is determined by a difference between a setpoint voltage TC of the electrical installation and a measured voltage $TM_1$, $TM_2$, $TM_3$ at the terminals of each generator.

According to these arrangements, the values of the setting quantities $V_k$ converge towards the same values, irrespective of the initial conditions or the impedances 1, 2, 3 of the installation between each generator $101_1$, $101_2$, $101_3$, while keeping a voltage of the electrical installation regulated around the setpoint voltage TC of the electrical installation.

The repetition time frequency of the steps of the method is determined, at least in part, according to the cutoff or operating frequency of the power converter of each generator; Thus, the repetition time frequency of the steps must be higher than or equal to the cutoff or operating frequency of the power converters.

According to one implementation, when the generators are grouped together within the same bank, the setting quantity $V_k$ is preferably an electric voltage and the repetition time frequency of the steps is preferably higher; thus a time frequency corresponding to a period of about 5 ms is advantageous.

According to another implementation, when the generators are physically scattered over a distributed electric power supply network, the physical scattering of the generators is at the origin of different impedances 1, 2, 3 over the different portions of the network on which are connected the terminals of the generators, as illustrated in FIG. 1; the consumption of these different impedances at the terminals of the generators is preferably carried out using an electric current intensity for the regulation of the charges and discharges of the storage elements of the generators, and by repeating the steps of the regulation method according to a lower time frequency than when the generators are grouped together within a bank; thus a time frequency corresponding, for example, to a period of about 80 ms is advantageous.

According to one embodiment, when a generator is not functioning, each generator is configured to determine a number of generators that are in proper operation state: the value of the state $N_k$ of each generator in proper operation state is equal to 1, for example, and the value of the state Nk of each generator in non-operating state is equal to 0, so that when adding, at the computing step 104, the received values for the state $N_k$ of each generator, the computing unit $UC_k$ of each generator is capable of determining, in a standalone manner, the number of generators that are capable of contributing to the supply with electrical energy of the electric consuming members of the installation. Thus, each generator is capable of applying to the setpoint power P a ratio adapted so that the total power delivered by all generators remains equal to the setpoint power P, after considering the regulation of the values of the charging and discharging setting quantity $V_k$ \$ of the storage elements according to a determined function.

According to one implementation, the function of the values of the setting quantity $V_k$ of charging and discharging of the storage elements is a Lyapunov function. According to these arrangements, for a given setpoint power, the charging or discharging electric power is distributed in an uneven manner over the different electric storage and rendering elements, so that the setting quantity of the electric power is kept balanced over all generators, irrespective of the initial conditions.

Figure 5:
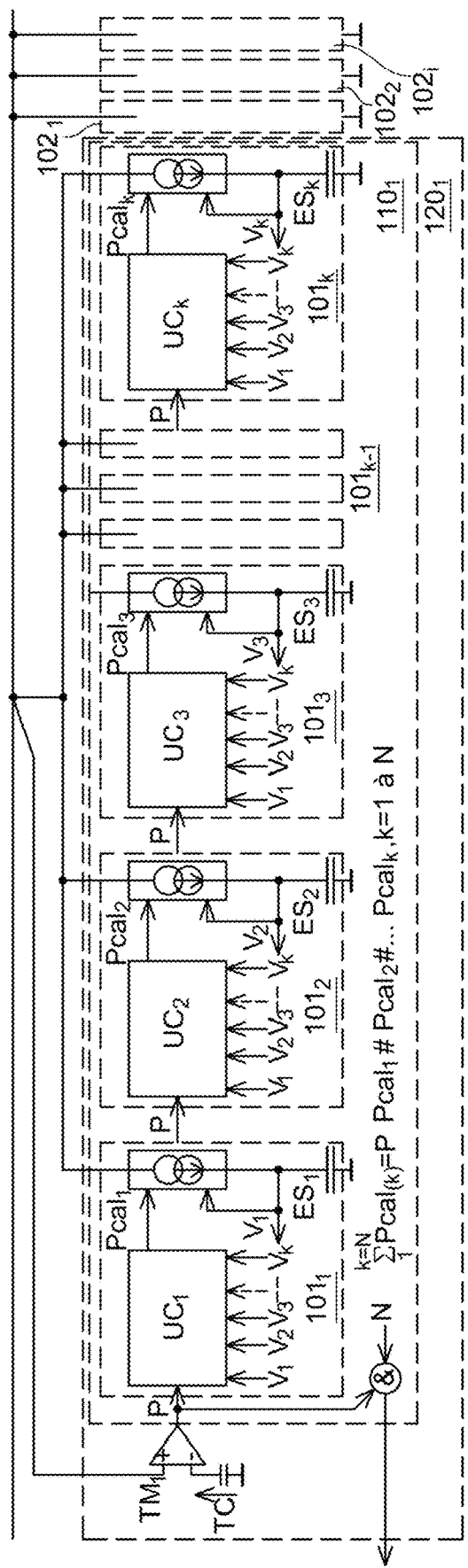
FIG. 5 is a more comprehensive representation of an embodiment of the invention.

FIG. 5 illustrates, in a more comprehensive way, an embodiment of the distribution, according to the method of the invention, of the charge amounts in each storage element ESk with k=1 to k=N of a device $110_1$ constituted by N electrical energy generators 101k, the device being included in a system $120_1$ connected to a distribution line and comprising a means for determining a setpoint power P.

The power setpoint P, requested by the system $120_1$, is determined according to the difference between the voltage $TM_1$ of the distribution line that powers the device $110_1$ and the setpoint TC.

In the case where the initial conditions are different from one storage element $ES_k$ to another, the charging or discharging powers $Pcal_k$ of each of the storage elements $ES_k$, determined by the computing units $UC_k$ will be different between the generators 101k. The computing unit $UC_k$ defines a power setpoint $Pcal_k$ for each electrical energy generator 101k so as to balance each storage element $ES_k$. Balancing is carried out according to the sign of P, the sign indicating whether the device is operated in the charging or discharging mode.

Thus, if P is positive, the device is operated in charging, then the storage elements $ES_k$ having the least charge will be mostly operated by a setpoint $Pcal_k$ which will be higher than the powers $Pcal_k$ corresponding to the most charged elements $ES_k$.

During this phase, the computing unit $UC_k$ weights the power $Pcal_k$ according to the charging state of each element so as to guarantee that the sum of the powers $Pcal_k$ of each electrical energy generator $101_k$ is equal to the setpoint P to ensure power and energy stability of the system. Indeed, each electrical energy generator $101_k$ should not receive or produce more power than wished by the device in real-time.

Conversely, if P is negative, the device is operated in discharging, then the storage elements $ES_k$ having the highest charge will be mostly operated by a setpoint $Pcal_k$ which will be higher than the powers $Pcal_k$ corresponding to the least charged elements $ES_k$.

Also, during this phase, the monitoring unit $UC_k$ weights the power $Pcal_k$ according to the charging state of each element so as to guarantee that the sum of the powers $Pcal_k$ of each electrical energy generator 101k is equal to the setpoint P to ensure power and energy stability of the system. Indeed, each electrical energy generator $101_k$ should not receive or produce more power than wished by the device in real-time.

According to these arrangements, the dosage estimated by the monitoring unit $UC_k$ allows weighting, in real-time and simultaneously, $Pcal_k$, according to the sign of P, for each energy storage element $ES_k$, while complying with an acceptable instantaneous power $Pcal_k$ in each energy storage element $ES_k$ and in each power converter $CP_k$.

Thus, balancing takes place without exceeding the physical limits of the elements $ES_k$ and $CP_k$.

Thus, the balancing strategy according to the invention results in charging or discharging the storage and rendering elements proportionally to the total requested charging or discharging power P; this balancing strategy excludes in particular the situation where a storage and rendering element $ES_k$ is being charged or discharged in another storage and rendering element $ES_j$, as is the case according to the balancing strategies of the prior art. Thus, the strategies of the prior art cause over-currents, on the one hand, in the energy storage elements ESk and, on the other hand, in the power converters CPk of the electrical energy generator $101_k$. The balancing strategy according to the invention allows avoiding these over-currents.

The device is continuously kept in operation, possibly to avoid an unbalance between the energy storage elements $ES_k$ while ensuring management of the power P supplied to the device $110_1$, although the powers $Pcal_k$ are different.

Moreover, a weighting of the setpoint value $Pcal_k$ by the monitoring unit $UC_k$ may be performed to compensate for a premature ageing of some energy storage elements $ES_k$ while keeping the sum of the $Pcal_k$ equal to the setpoint P.

Because, the sum of the charging and discharging electric powers $Pcal_k$ of each storage element $ES_k$ of each generator $101_k$ of the plurality is equal to the determined electric power P.

The line voltage $TM_1$ is naturally regulated, thanks to the adjustment of the power P according to the difference of the line voltage $TM_1$ measured at the terminals $120_1$ and the voltage setpoint TC:
- if these last two voltages are identical because of the absence of loads $102_1$, $102_2$, $102_i$, on the line, then the power P will be zero because the measured voltage $TM_1$ will be equal to the setpoint voltage TC.
- if $TM_1$>TC, then the power P will be determined proportionally to the difference of the voltages and it will charge elements ESk according to the computation of Uck.
- if $TM_1$<TC, then the power P will be determined proportionally to the difference of the voltages and it will discharge elements ESk according to the computation of Uck.

Figure 6:
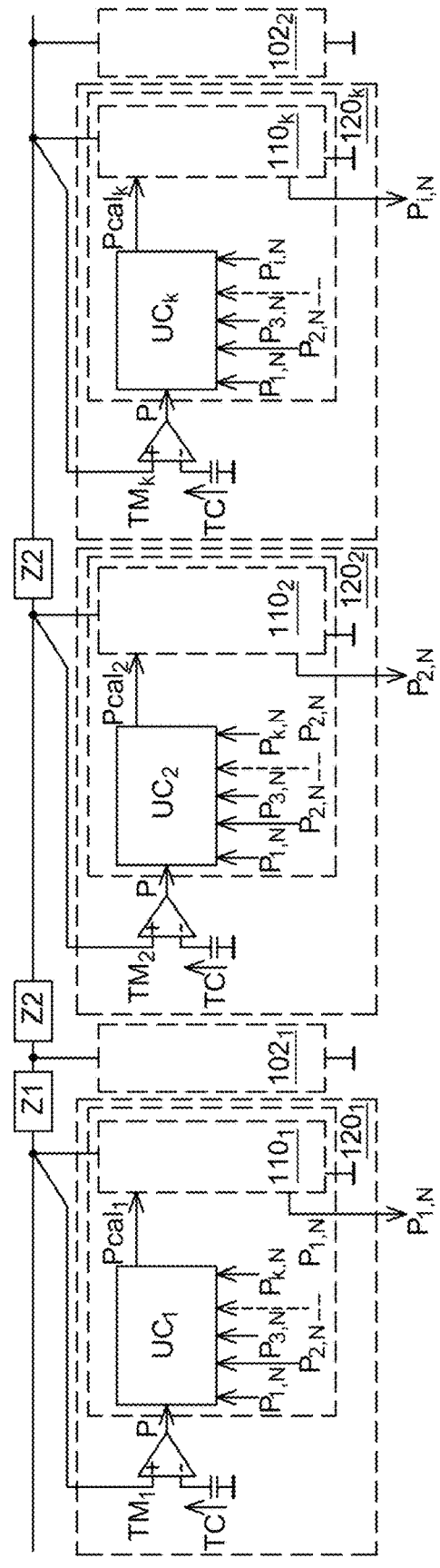
FIG. 6 is a more comprehensive representation of an embodiment of the invention.

FIG. 6 uses the same principle, with several systems $120_1$, $120_2$, . . . , $120_k$ to balance:
- either the setpoint power $P_k$ in each system $120_k$.
- or the setpoint current $I_k$ in each system $120_k$ (this alternative is not represented in FIG. 6, but the method is identical to that one described hereinabove to determine the setpoint power $P_k$).

Thus, in FIG. 6, the setpoint power $Pcal_k$ then becomes the power setpoint of each device $110_k$ and the latter is calculated by $UC_k$, so as to have an identical power $P_k$ in each system $120k$, regardless of the line impedances z1, z2 to zk.

The described method is implemented, for example, in 40-meter tramway vehicles in Nice in France, with the configuration of a vehicle under development comprising three devices $101_k$ (k=1 to 3) in a system $120_i$, with 3 systems $120_i$ (i=1 to 3) disposed in a heterogeneous manner in the vehicle.

It is also implemented on 30-meter tramway vehicles in Kaohsiung in Taiwan with the configuration of a vehicle under development comprising 3 devices $101k$ (k=1 to 3) in a system $120_i$, with 2 systems $120_i$ (i=1 to 2) disposed in a heterogeneous manner in the vehicle.

The invention claimed is:

1. An electric power device for supplying or recovering an electrical energy from at least one electrical member of an electrical installation, the electrical member rendering and/or consuming electrical energy, the device comprising a plurality of electrical energy generators, each generator of the plurality of electrical energy generators being electrically connected in parallel with other generators of the plurality of electrical energy generators, each generator of the plurality of electrical energy generators comprising a computing unit, a power converter and an electrical energy storage and rendering element, the power converter being bidirectional and configured to monitor a value of a setting quantity based on a charging or discharging electric power of the electrical energy storage and rendering element, the computing unit being configured to compute in real-time a charging or discharging electric power according to:
 a function of values of setting quantities of the charging or discharging electric power of each of the electrical energy storage and rendering elements of each other generators of the plurality of electrical energy generators,
 a determined setpoint electrical power equal to a sum of the charging or discharging electric powers of the electrical energy storage and rendering elements of the plurality of electrical energy generators, and
 a number of generators that are in a determined operating state,
 wherein the setpoint electric power is adjusted by the computing of each generator according to a voltage difference between a line voltage measured at terminals of the electrical energy generator and a setpoint voltage of the electrical installation, as follows:
 if the line voltage is equal to the setpoint voltage due to absence of the at least one electrical member, then the setpoint electric power is set to zero,
 if the line voltage is greater than the setpoint voltage, then the setpoint electric power is determined as a function of the voltage difference and the setpoint voltage and the electrical energy storage and rendering elements are charged according to the charging electric power computed by the computing unit,
 if the line voltage is lower than the setpoint voltage, then the setpoint electric power is determined as a function of the voltage difference and the electrical energy storage and rendering elements are discharged according to the discharging electric power computed by the computing unit.

2. The device according to claim 1, wherein the function of the values of the setting quantities and of the determined setpoint power, is a Lyapunov function.

3. The device according to claim 1, wherein the setting quantity of an electric power is an electric voltage or an electric current intensity or a cumulative count of an electric charge flowing in the electrical energy storage and rendering element.

4. A method for supplying an electrical energy to or recovering an electrical energy from at least one electrical member of an electrical installation, the electrical member rendering electrical energy or consuming electrical energy, the electrical energy being delivered by or rendered to a plurality of electrical energy generators, each generator of the plurality of electrical energy generators being electrically connected in parallel with other generators of the plurality of electrical energy generators, each generator of the plurality of electrical energy generators comprising a computing unit, a bidirectional power converter and an electrical energy storage and rendering element, the method being performed by the computing unit of each generator of the plurality of electrical energy generators and comprising:
 reading a value of a setting quantity of the power converter;
 reading a value of an operating state of the generator;
 transmitting to each other generator of the plurality of electrical energy generators the value of the setting quantity of the power converter and the value of the operating state of the generator;
 determining a number of generators that are in a determined operating state, from the value of the operating state of each generator of the plurality of electrical energy generators;
 computing a charging or discharging electric power of the electrical energy storage and rendering element, according to:
 a function of the value of the setting quantity of a charging or discharging electric power of each electrical energy storage and rendering element of the plurality of electrical energy generators,
 a determined setpoint electrical power equal to a sum of the charging or discharging electric powers of the electrical energy storage and rendering elements of the plurality of electrical energy generators, and
 monitoring the value of the setting quantity of the electrical energy storage and rendering element based on the computed charging or discharging electric power computed by the computing unit,
 wherein the setpoint electric power is adjusted by the computing of each generator according to a voltage difference between a line voltage measured at terminals of the electrical energy generator and a setpoint voltage of the electrical installation, as follows:
 if the line voltage is equal to the setpoint voltage due to absence of the at least one electrical member, then the setpoint electric power is set to zero,
 if the line voltage is greater than the setpoint voltage, then the setpoint electric power is determined as a function of the voltage difference and the setpoint voltage and the electrical energy storage and rendering elements are charged according to the charging electric power computed by the computing unit,
 if the line voltage is lower than the setpoint voltage, then the setpoint electric power is determined as a function of the voltage difference and the electrical energy storage and rendering elements are discharged according to the discharging electric power computed by the computing unit.

5. The method according to claim 4, wherein the function of the value of the setting quantity of the charging or discharging electric power, is a Lyapunov function.

6. The method according to claim 5, repeated according to a repetition time frequency.

7. The method according to claim 6, wherein the repetition time frequency is determined at least partially according to an operating frequency or a cutoff frequency of the power converter of the generator.

8. The method according to claim 4, repeated according to a repetition time frequency.

9. The method according to claim 8, wherein the repetition time frequency is determined at least partially according to an operating frequency or a cutoff frequency of the power converter of the generator.

* * * * *